(No Model.) 3 Sheets—Sheet 1.
C. A. READE.
CAB.
No. 401,758. Patented Apr. 23, 1889.
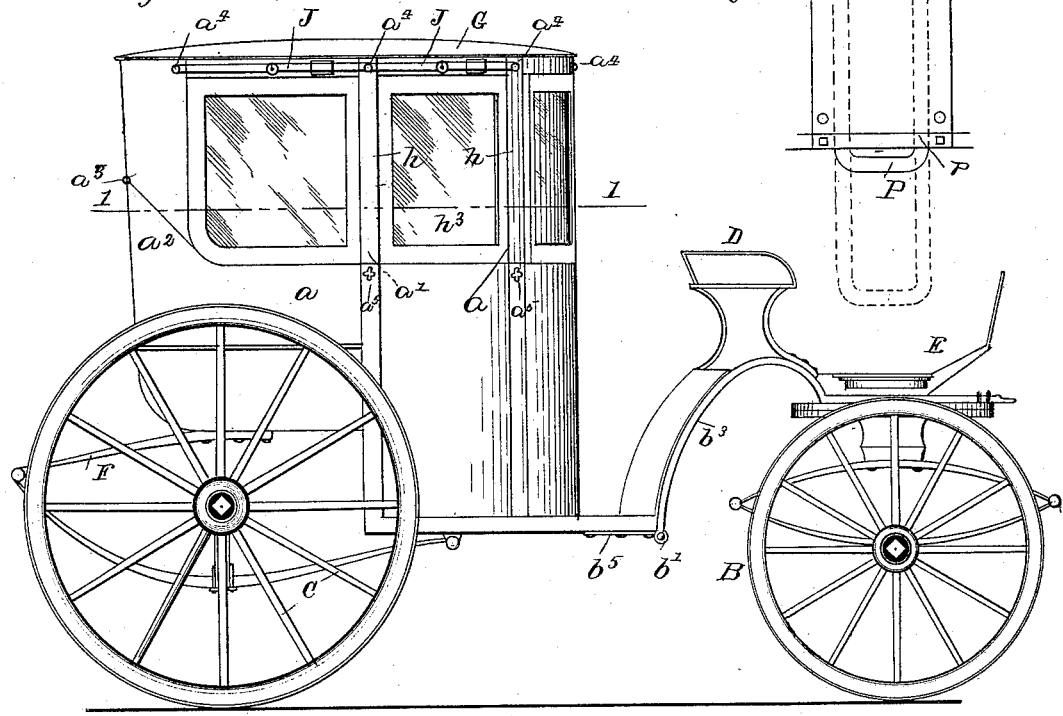
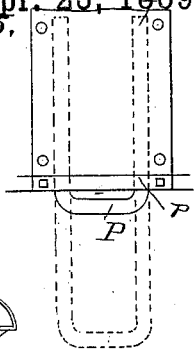
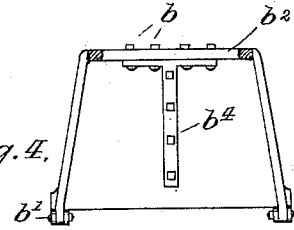
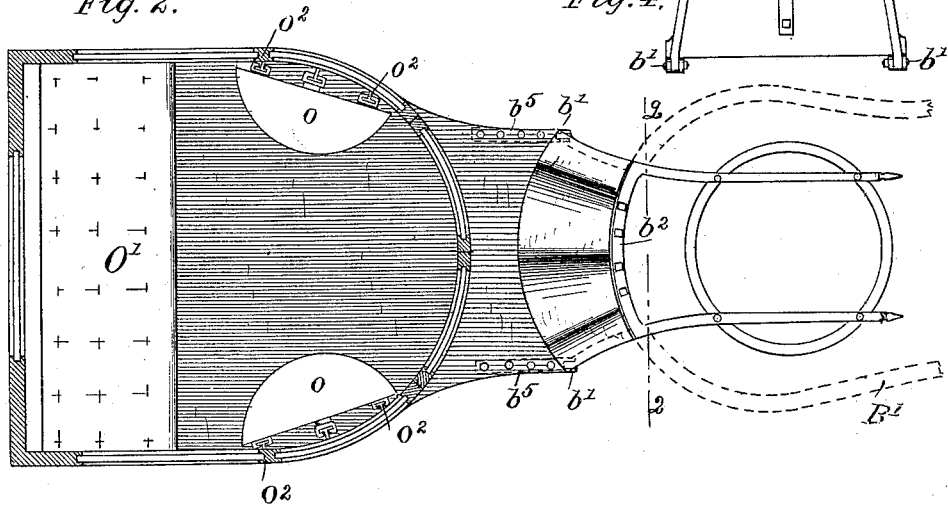
Witnesses:
C. W. Davenport
Fred H. Brown
Inventor:
Charles A. Reade
By Samuel B. Dover
Atty.
N. PETERS, Photo-Lithographer, Washington, D. C.

(No Model.) 3 Sheets—Sheet 2.
C. A. READE.
CAB.
No. 401,758. Patented Apr. 23, 1889.
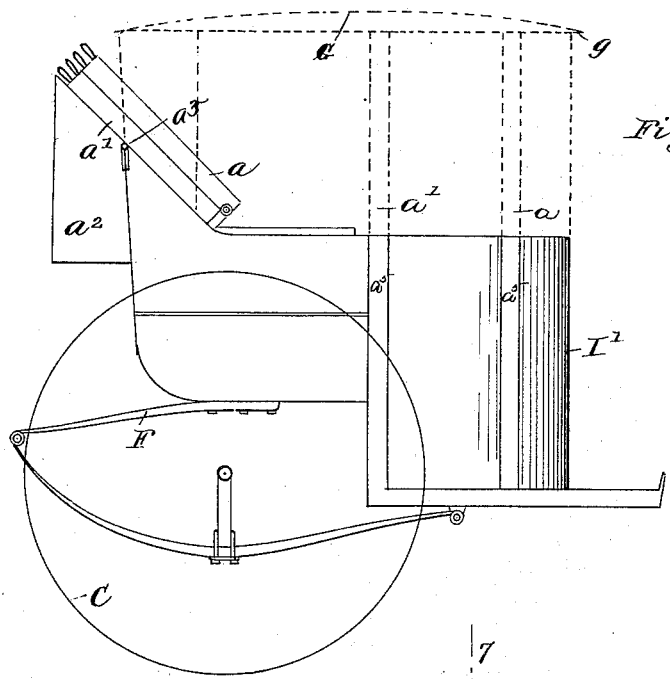
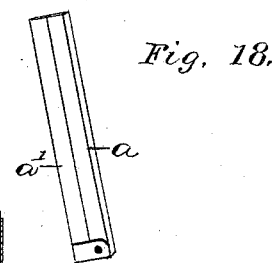
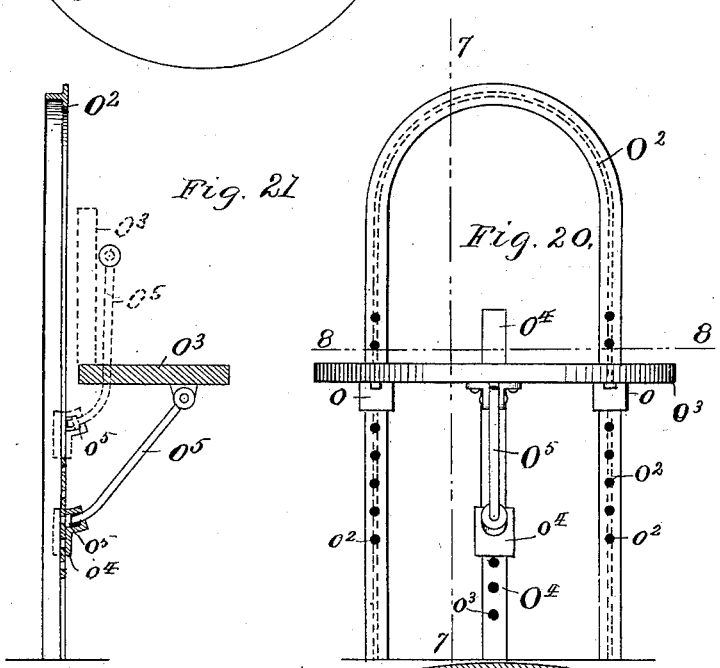
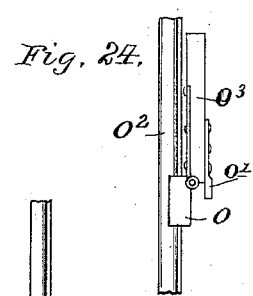
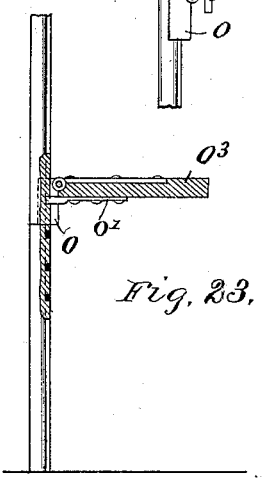
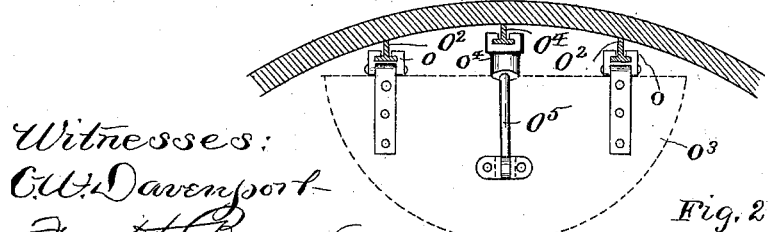
Witnesses:
C. W. Davenport
Fred H. Brown
Inventor:
Charles A. Reade
By Samuel B. Dover
Atty.

(No Model.) 3 Sheets—Sheet 3.
C. A. READE.
CAB.
No. 401,758. Patented Apr. 23, 1889.
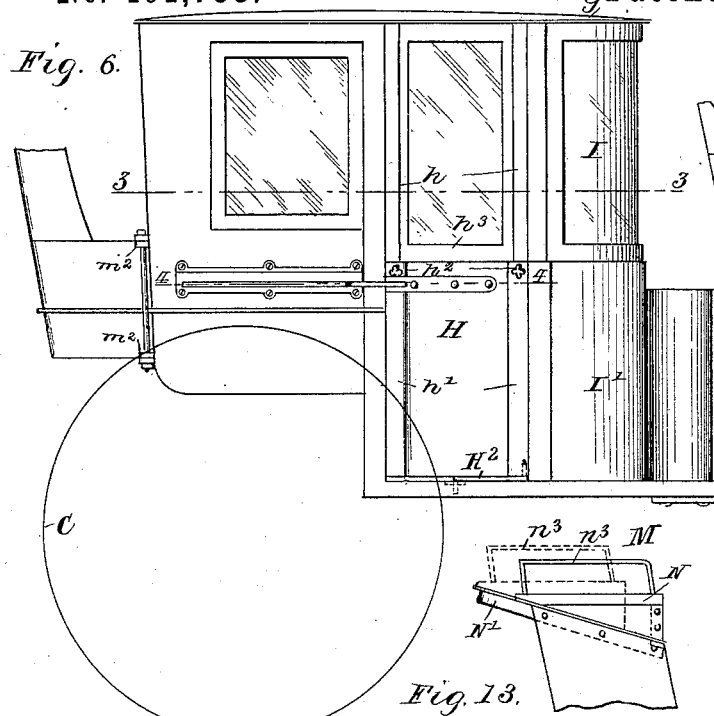
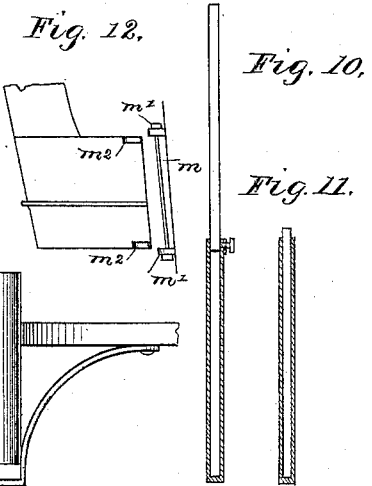
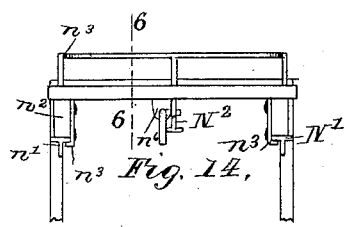
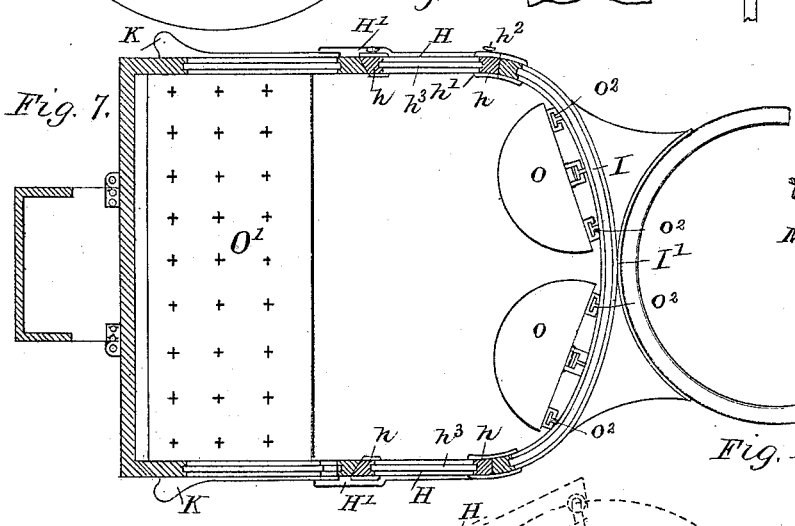
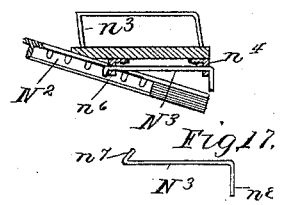
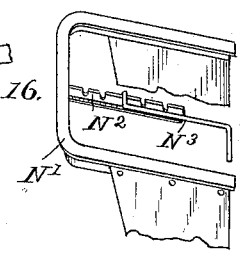
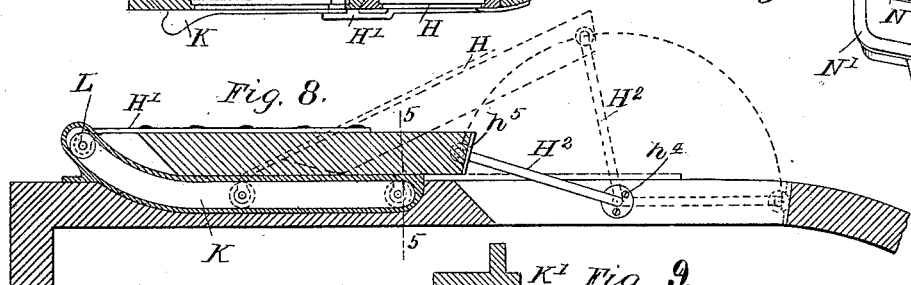
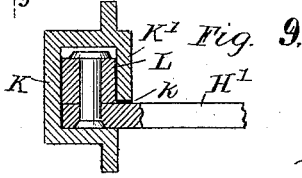
Witnesses:
C. W. Davenport
Fred H. Brown
Inventor:
Charles A. Reade
By Samuel B. Dover
Atty.
N. PETERS, Photo-Lithographer, Washington, D. C.

UNITED STATES PATENT OFFICE.

CHARLES A. READE, OF CHICAGO, ILLINOIS.

CAB.

SPECIFICATION forming part of Letters Patent No. 401,758, dated April 23, 1889.

Application filed June 18, 1888. Serial No. 277,402. (No model.)

*To all whom it may concern:*

Be it known that I, CHARLES A. READE, a citizen of the United States, residing at Chicago, in the county of Cook and State of Illinois, have invented certain new and useful Improvements in Cabs, of which the following is a full and exact specification.

My invention relates to vehicles having bodies of the cab form adapted to be entirely closed in by suitable frame-work and by doors suspended thereto.

The object of my improvements is to provide a frame-work and doors of such construction as to facilitate the conversion of the cab from a closed into an open carriage when desirable, to increase the carrying capacity of the cab without materially enlarging its body, to sustain and open the doors into such position that all obstruction to the entrance and egress of passengers through the doorway is removed, to so connect the front running-gear of the four-wheeled cab to the body as to permit of readily detaching it therefrom when a two-wheeled cab is the preferable form, to make it possible to readily attach a driving-seat to the rear of the body of the cab when so converted into a two-wheeled vehicle, and to make this seat of such form that it may be conveniently shifted outwardly or inwardly to balance the unequal weight of different occupants of the cab.

Other minor improvements will be mentioned as they occur hereinafter.

In the drawings illustrative of my invention, Figure 1 is a side elevation of a four-wheeled cab. Fig. 2 is a sectional plan view of the body of the same cab, taken on line 1 1 of Fig. 1. Fig. 3 is a side elevation of the cab with the top and sides thrown back. Fig. 4 is a transverse sectional view taken on line 2 2, illustrating the means of connection of the frame of the front running-gear with the body of the cab. Fig. 5 is a plan view of the trunk-rest adapted to be drawn out from the frame of the cab to afford support for bulky packages. Fig. 6 is a side elevation of a form of cab-body modified somewhat from that illustrated in Fig. 1. Fig. 7 is a sectional plan view of the same, taken on line 3 3 of Fig. 5. Fig. 8 is an enlarged sectional view of the guide and of the sliding hinge which supports the door, taken on line 4 4 of Fig. 6. Fig. 9 is a transverse sectional view of the same guide and hinge, taken on line 5 5 of Fig. 8. Fig. 10 is a sectional view of the door of the cab with its sash raised. Fig. 11 is a similar view with the sash lowered. Fig. 12 is a broken detail view of the supporting-stand of the driver's seat, showing the means of its attachment to the rear of the cab. Fig. 13 is a side view of the driver's adjustable seat. Fig. 14 is a front view of the same. Fig. 15 is a sectional view of the seat, taken on line 6 6 of Fig. 14. Fig. 16 is a view of seat-frame with the seat removed. Fig. 17 is a detail perspective view of the latch-rod which locks the seat into position. Fig. 18 is a detail view of the standards which support the roof of the cab. Fig. 19 is a sectional view of the cab-door with its sash lowered. Fig. 20 is a front elevation of an adjustable seat to be used when the capacity of the rear seat is insufficient. Fig. 21 is a sectional view of the same, taken on line 7 7 of Fig. 20. Fig. 22 is a transverse sectional view of the hinges and standards of the seat, taken on line 8 8 of Fig. 20. Fig. 23 is a sectional view on line 9 9 of Fig. 20, showing the means of supporting the seat. Fig. 24 is a side view of the same mechanism.

Like letters indicate similar parts throughout the several views.

Referring now particularly to Figs. 1 to 5, inclusively, A indicates the body of the cab mounted on four wheels; B, the front running-gear; C, the rear running-gear; D, the driver's seat; E, the driver's platform; F, the rear spring, upon which the body of the cab is supported. This spring is of peculiar construction, its upper member consisting of one-half of an elliptic spring and its lower member of a C-spring united to it by the usual clasps. This combination of parts brings the forward end of the C-spring sufficiently low to allow of its attaching under the platform of the cab-body, the axle being of the crank form and united to it by clips in the usual position.

Heretofore it has been the common custom in cab construction to connect the forward end of the lower member of the spring to the body between its side and the wheel. By the arrangement here shown additional width may be given the cab-body, or, if desired, the distance between the wheels of the cab may be decreased.

The top or roof G of the cab is preferably formed of leather supported by the usual standards, $a$, $a'$, and $a^2$. These several standards are each separated from the body of the frame-work of the cab on a line with the lower edges of the windows, and are fixed thereto in suitable sockets by thumb-screws $a^5$. The rear standard, $a^2$, may, however, be hinged to the frame-work at the point $a^3$. The frame-standards $h$ of the door H are arranged to telescope into the lower panel portion, $h'$.

The operation of converting the closed cab into an open vehicle will now be described. The sashes $h^3$ of the doors H are dropped into the recesses between their double panel. The set-screws $h^2$, which secure the standards $h$ in their raised position, are next loosened, and the standards $h$ telescoped into the frame of the door and there fixed. The other window-sashes are lowered into the recesses prepared for them, leaving the standards only in their raised position. The construction of a hollow double panel, I', into which to telescope the front sash, I, of the cab, is possible in this form of body, since the depth of the panel at this point is as great as at other points, extending to the floor-platform. This is a feature peculiar to cab-bodies. The front portion, $g$, of the roof or leather top G of the cab is now unfastened from the buttons $a^4$ and turned back upon itself. The standards $a$ $a'$ $a^2$ are next loosened, the tightening-toggles J thrown up, and the top and its frame-work forced back until the various parts occupy the position shown in Fig. 3. To facilitate this operation, the standards $a$ and $a'$ may be hooked together at their lower ends and be operated as a single piece.

The method of reconverting the open cab into a closed cab is obvious and need not be described.

The arrangement of cab-doors hinged to swing outwardly is in some ways unsatisfactory. They cannot be thrown entirely open, since the rear wheels of the cab interfere therewith, and in consequence passengers are inconvenienced in their entrance and exit to the cab. Moreover, the door is liable to be unlocked and thrown open by the motion of the vehicle, incurring the risk of its being torn from its hinges by passing vehicles. Doors which are arranged to swing or slide into position between the sides of the cab and the rear wheels or between the dash and the body of the cab are free from these objections.

The mechanism shown in Figs. 6 to 9, inclusively, by which a sliding hinging motion is given the door in opening and closing it, will now be described. A guide-casting, K, is secured to the side of the cab at the proper height and determines the motion of the rear edge of the door. This casting may be of any suitable form in transverse section, the form shown in Fig. 9 being found satisfactory. It is recessed its entire length, and has a flange, K', projecting downwardly to a sufficient depth to afford a retaining-wall, K', for the friction-roll L, which is carried upon the end of the guide-hinge H', the said hinge entering the guide-casting K through the slot $k$, formed between the lower edge of the wall K' and the bottom of the casting. This arrangement of the slot insures freedom from non-action through clogging by ice or other foreign matter. The rear end of the casting K in the form shown has a slight outward turn to permit the door when opened to its fullest extent to lie closely against the side of the cab. The front portion of the door is supported upon a swinging arm or arms, H², arranged at the bottom or at the top and bottom of the door, as illustrated most clearly in Figs. 6 and 8. As here shown, one end of the arm pivots in the casting $h^4$ in a socket in the floor of the cab, and the other is pivotally secured to a casting, $h^5$, fastened to the edge of the door at its bottom. The door when opened has a sliding motion at its rear end and a swinging motion at its forward end, which carries it to the position shown in dotted lines of Fig. 8 and finally into its full-line position against the side of the cab, leaving the doorway entirely unobstructed. When the door is not of the telescope form, swinging hinges may be used, top and bottom.

When it is desired for any reason to convert the four-wheeled vehicle illustrated in Figs. 1, 2, and 4 into a two-wheeled cab, it may be done as follows: The bolts $b$ $b$ and $b'$ $b'$ are withdrawn from their places, and the frame of the front running-gear, which has been united to the frame of the rear gear by them, may then be drawn away, carrying with it the driver's seat mounted thereon. A shaft, B', which has a transverse bar similar to the bar $b^2$ of the front running-gear, and also descending braces corresponding to the irons $b^3$ of the gear, and fitted to be secured by the bolts $b$ and $b'$ to the irons $b^4$ and $b^5$ in the same manner, may then be substituted for the front gear and attached to the cab. The driver's seat M may be attached in its proper position to the rear of the cab by means of the bolts $m$, inserted through apertures in the lugs $m'$ and $m^2$, projecting, respectively, from the back of the cab and from the bottom of the seat-stand, as shown in Figs. 6 and 12. Other means by which this stand may be united to the cab may readily be devised by the exercise of ordinary mechanical skill. I claim, broadly, however, any detachable driver's seat. This seat may be of the ordinary form or may be the preferred seat illustrated in Figs. 13 to 17, inclusively. This seat is adjustable forwardly and rearwardly to maintain the balance of the vehicle and its occupant by the shifting of the weight of the driver to increase or decrease the leverage. It has a special feature which consists of inclining its base and the ways upon which its base rests at a considerable angle upwardly and to the rear, so that when the seat is moved to the rear it also rises, and in such proportion that the eye of the driver is kept constantly in the same relative position respecting the head of the horse and the top of vehicle, thus enabling him to drive with the same convenience as before. It will be observed that to the driver this gives a considerable advantage over seats having a sliding motion in a direct horizontal plane.

In the seat which I have illustrated as embodying one form which my invention may assume, N' is a bar of T-iron secured to and completing the top of the stand upon which the seat N is to rest. This is inclined at a considerable angle and has projecting midway between its ends a second piece, $N^2$, of T-iron inverted and provided with recesses to form a rack. Upon the flat top of its parallel longitudinal portions the angular sides $n^2$ of the sliding seat rest, held in position by cleats $n^3$. A latch-rod, $N^3$, is carried in fixed bearings $n^6$ below the bottom of the seat and terminates at one end in the latch $n^7$, arranged to drop into the recesses of the rack $N^2$, and thus to secure the seat in any position desired. The rod is operated at its forward end by an angular arm, $n^8$. Other means of securing the seat—such as by the use of set-screws—may be readily arranged. It is deemed sufficient to show the one form preferred.

It is frequently desirable to convey in a cab more passengers than may be accommodated by the single rear seat, O'. To provide for such emergencies, the hinged seats O have been devised. The construction of these will be understood by reference to Figs. 2 and 7 and 20 to 24, inclusive. A frame, $O^2$, of T-iron, is fastened to the inside wall of the cab—in the position shown in Fig. 2 in this form of cab and in the position shown in Fig. 7 in that form of cab. A seat, $O^3$, is hinged to the castings $o$, which embrace and slide up and down upon the outer flange of the T-iron. A bolt-catch, $o'$ projects from each side of the rear edge of the bottom of the seat-board in such a position that when the seat is lowered the projecting ends of the bolts enter the apertures $o^2$ in the face of the T-iron $O^2$, supporting the seat at any height at which it may be placed. A second T-iron, $O^4$, is fastened to the wall of the cab midway between the legs of the iron $O^2$ and is similarly provided with apertures $O^3$. A bracket-rod, $O^5$, is pivoted to the bottom of the seat near its front edge and enters at its lower end a chamber in a casting, $o^4$, in which it has a limited motion, retained therein by a collar, $o^5$. (Shown most clearly in Fig. 21.) The extreme end of the rod fits into the apertures $O^3$. The casting $O^4$ is carried up and down by and operates with the rod when the seat is raised or lowered, and maintains its end in position to enter the apertures $O^3$ without any special attention being given to it.

It will be readily seen that the described combination of parts will produce a substantial seat having a convenient back-rest and quickly adjustable in height to the comfort of any occupant. Ordinarily these seats will be thrown up out of the way and not interfere with passengers occupying the rear seat, and when in use will still permit the feet to be extended under them. It is obvious that the capacity of the cab is doubled by their use with but little additional discomfort to the occupants of the vehicle. When a large panel forms the front of the cab, these seats will be placed directly in front of it, and when this space is used for the doors the seats will be placed upon the sides.

It is frequently a matter of convenience to carry large packages—such as trunks and other traveling baggage—upon the foot-platform before the driver's seat. To enlarge the carrying capacity of the vehicle and to reduce to a minimum the discomfort of the driver, a T-iron, P, of the form shown in Fig. 5, may be arranged in sliding bearings $p$ and adapted to be drawn out into the dotted-line position, as illustrated, and there sustained in readiness to support any weight which may be placed upon it. If desired, both sides of the vehicle, and also other parts of it, may be fitted with like retractible supports, and the facilities for carrying such packages much increased thereby.

In several of the elements involved in this invention I have described the use of T-iron as a preferred form of construction. I do not desire to limit myself narrowly to any one embodiment.

I claim—

1. In a covered vehicle, the fixed front panel which extends from the level of the floor of the vehicle to a point about midway in its height, in combination with a sash arranged to telescope into the panel, substantially as described.

2. In combination, in the body of a covered vehicle, doors, the position of which is substantially upon the sides of the vehicle, a floor-platform extending to the front of the vehicle, a bayed front wall extending from the floor-platform to the roof to form a recessed interior to the vehicle forward of the doors of the full height of the vehicle, and seats therein adapted to be removed or folded out of the way to permit of said recess being used when the seats are unoccupied, as specified.

3. In a cab-body, the combination of window-sashes in the sides of the vehicle, socket-receptacles into which they telescope, sectional doors, a roof to the vehicle of flexible material, and sectional standards to support the roof, the upper portions of the standards adapted to be loosened from the lower portions and carried to the rear with the roof-covering, as specified.

4. In a cab-body, the combination of window-sashes in the sides of the vehicle, socket-receptacles into which they telescope, a roof to the vehicle of flexible material, and sectional standards to support the roof, the upper portions of the standards being provided with socket ends and adapted to be loosened from the lower portions and carried to the rear with the roof-covering, as specified.

5. In combination with a vehicle, a vehicle-door which opens and closes with a sliding swinging motion determined by suitable guides upon the one side thereof and upon the other side by a hinge or hinges which swing the door outwardly and then inwardly, substantially as shown.

6. A vehicle and a guide-casting, K, in combination with a vehicle-door, a guiding-arm, H', and a hinge, H², all operating together, substantially as and for the purpose specified.

7. In combination with a vehicle-seat, parallel rack-standards O², casting o, arranged to slide upon the standards, hinges which unite the seat to the castings, and a bolt, o', projecting from the seat and adapted when the seat is lowered to enter the apertures in the standards O² to sustain the seat in position, substantially as specified.

8. In a vehicle, a standard provided with apertures to form a rack, in combination with a seat adjustable in height, an arm pivoted to the seat, and a casting movably secured to the rack through which the lower end of the arm operates and engages in the apertures of a rack, the said arm being retained in the casting in such manner as to be limited in its motion, as specified.

9. A convertible four-wheeled cab having that portion of the frame-work of its front running-gear which attaches directly to the body of the vehicle of identical or equivalent shape with the similar portion of a shaft used by two-wheeled cabs, the said running-gear and the said shafts being readily interchangeable and the vehicle thus made convertible, as specified.

10. In a cab interchangeably convertible from a two into a four wheeled vehicle, a rear elevated driving-seat, the stand of which is detachably connected to the body of the cab, for the purpose specified.

11. In a package-support for vehicles, the combination of a $\cup$-shaped continuous bar of angle-iron with guides secured to the vehicle in which the legs of the angle-bar may slide and the bar be supported when extended beyond the edge of the vehicle, as specified.

12. An elevated rear driving-seat to a cab, the base of which is inclined upwardly and to the rear and a latch-rod attached in bearings thereto, in combination with a seat-support similarly inclined, and with a rack-bar, N², adapted to co-operate with it and secure the seat in any adjusted position, as and for the purpose specified.

In witness whereof I hereunto subscribe my name this 14th day of June, A. D. 1888.

CHARLES A. READE.

Witnesses:
SAMUEL B. DOVER,
C. W. DAVENPORT.